US012395805B2

(12) United States Patent
Zheng et al.

(10) Patent No.: US 12,395,805 B2
(45) Date of Patent: Aug. 19, 2025

(54) METHOD AND SYSTEM FOR INSTRUMENT SEPARATING AND REPRODUCING FOR MIXTURE AUDIO SOURCE

(71) Applicant: HARMAN INTERNATIONAL INDUSTRIES, INCORPORATED, Stamford, CT (US)

(72) Inventors: Jianwen Zheng, Shenzhen (CN); Hongfei Zhou, Shenzhen (CN)

(73) Assignee: Harman International Industries, Incorporated, Stamford, CT (US)

( * ) Notice: Subject to any disclaimer, the term of this patent is extended or adjusted under 35 U.S.C. 154(b) by 502 days.

(21) Appl. No.: 17/879,552

(22) Filed: Aug. 2, 2022

(65) Prior Publication Data

US 2023/0040657 A1 Feb. 9, 2023

(30) Foreign Application Priority Data

Aug. 6, 2021 (CN) ......................... 202110900385.7

(51) Int. Cl.
*G10L 21/10* (2013.01)
*G10L 21/0272* (2013.01)
*H04S 7/00* (2006.01)

(52) U.S. Cl.
CPC ............ *H04S 7/30* (2013.01); *G10L 21/0272* (2013.01); *G10L 21/10* (2013.01); *H04S 2400/01* (2013.01)

(58) Field of Classification Search
None
See application file for complete search history.

(56) References Cited

U.S. PATENT DOCUMENTS

| | | | | |
|---|---|---|---|---|
| 7,444,353 | B1 * | 10/2008 | Chen | G06F 3/167 |
| 2011/0075851 | A1 * | 3/2011 | LeBoeuf | G10L 25/51 381/56 |
| 2014/0348327 | A1 | 11/2014 | Linde et al. | |
| 2015/0063574 | A1 | 3/2015 | Choi et al. | |
| 2015/0278686 | A1 | 10/2015 | Cardinaux et al. | |
| 2015/0380014 | A1 * | 12/2015 | Le Magoarou | G10L 25/81 704/258 |
| 2016/0054976 | A1 * | 2/2016 | Seok | G11B 27/031 700/94 |

(Continued)

FOREIGN PATENT DOCUMENTS

| | | |
|---|---|---|
| EP | 3127115 A1 | 2/2017 |
| EP | 3608903 A1 | 2/2020 |

(Continued)

OTHER PUBLICATIONS

European Search Report dated Dec. 19, 2022 for European Patent Application No. 22184920.1, 7 pages.

*Primary Examiner* — Neeraj Sharma
(74) *Attorney, Agent, or Firm* — Brooks Kushman P.C.

(57) ABSTRACT

A method and a system for instrument separating and reproducing for a mixture audio source is provided. The method and/or the system includes inputting selected music into an instrument separation model for extracting features therefrom, determining audio source signals of multiple channels for the separation of all instruments, each channel containing sound of one instrument, and transmitting the signals of the different channels to multiple speakers placed at designated positions for playing, which can reproduce or recreate an immersive sound field listening experience for users.

25 Claims, 5 Drawing Sheets

(56) References Cited

U.S. PATENT DOCUMENTS

| | | | | |
|---|---|---|---|---|
| 2018/0366097 | A1* | 12/2018 | Sharp | G10H 1/361 |
| 2019/0005684 | A1* | 1/2019 | De Fauw | G06V 10/82 |
| 2019/0043528 | A1* | 2/2019 | Humphrey | G06F 16/683 |
| 2019/0065469 | A1* | 2/2019 | Nazer | G06F 40/242 |
| 2019/0304480 | A1* | 10/2019 | Narayanan | G10L 13/02 |
| 2020/0035256 | A1 | 1/2020 | Choi | |
| 2020/0043517 | A1* | 2/2020 | Jansson | G10L 25/81 |
| 2020/0105244 | A1* | 4/2020 | Kuramitsu | G10L 13/00 |
| 2021/0120355 | A1* | 4/2021 | Kim | H04S 5/00 |

FOREIGN PATENT DOCUMENTS

| | | | |
|---|---|---|---|
| JP | 2007181135 | A | 7/2007 |
| WO | 2016140847 | A1 | 9/2016 |

* cited by examiner

METHOD AND SYSTEM FOR INSTRUMENT SEPARATING AND REPRODUCING FOR MIXTURE AUDIO SOURCE

CROSS-REFERENCE TO RELATED APPLICATIONS

This application claims priority to Chinese application Serial No. 202110900385.7 filed Aug. 6, 2021, the disclosure of which is hereby incorporated in its entirety by reference herein.

TECHNICAL FIELD

The present disclosure generally relates to audio source separation and playing audio. More particularly, the present disclosure relates to a method and a system for instrument separating and transmission for a mixture music audio source as well as reproducing same separately on multiple speakers.

BACKGROUND

In scenarios where better audio effects are required, multi-speaker playing can usually be used to enhance the live listening experience. Many speakers now support audio broadcasting. For example, several of JBL's® portable speakers have an audio broadcasting function called Connect+®, which can also be referred to as a 'Party Boost' function. Wireless connection to hundreds of Connect+®-enabled speakers allows the multiple speakers to play the same signal synchronously, which may magnify the users' listening experience to an epic level and perfectly achieve stunning party effects.

However, existing speakers can only support stereo signal transmission at most during broadcasting, or even master devices can only broadcast mono signals to other slave devices, which helps to significantly increase the sound pressure level, but makes no contribution to the enhancement of the sense of depth of the sound field. For example, when music played by multiple instruments is played through speakers, the melody part is mainly reproduced, so the users' listening experience is more focused on the horizontal flow of the music, and it is difficult to identify the timbre between different instruments. On the other hand, based on the audio transmission characteristics of the existing speakers, the audio codec and single-channel transmission mechanisms thereof cannot meet the multi-channel and low-latency audio transmission requirements.

Therefore, there is currently a need for a practical method to reproduce the timbre of different channels of an audio source via multiple speakers with better sound quality, higher bandwidth efficiency, and higher data throughput.

SUMMARY

The present disclosure provides a method for instrument separating and reproducing for a mixture audio source, including converting the mixture audio source of selected music into a mixture audio source spectrogram, where the mixture audio source includes sound of at least one instrument; after that, putting the spectrogram into an instrument separation model to sequentially obtain an instrument feature mask of each of the at least one instrument from the mixture audio source, and obtaining an instrument spectrogram thereof based on the instrument feature mask of the each of the at least one instrument; then, determining an instrument audio source of the instrument based on the instrument spectrogram thereof; and finally, respectively feeding the instrument audio sources of the at least one instrument to at least one speaker, and reproducing the respective instrument audio sources of the corresponding instruments by the at least one speaker.

The present disclosure also provides a non-transitory computer-readable medium including instructions that, when executed by a processor, implements the method for instrument separating and reproducing for a mixture audio source.

The present disclosure also provides a system for instrument separating and reproducing for a mixture audio source, including a spectrogram conversion module, an instrument separation module, an instrument extraction module and an instrument audio source rebuilding module, where the spectrogram conversion module is configured to convert the received mixture audio source including the sound of the at least one instrument into the mixture audio source spectrogram; the instrument separation module includes the instrument separation model configured to sequentially extract the instrument feature masks of the at least one instrument from the mixture audio source, and the instrument feature masks are applied to the originally input mixture audio source spectrogram in the instrument extraction module, so that the instrument spectrogram of the each of the at least one instrument is obtained based on the instrument feature mask of thereof; then, the instrument audio source rebuilding module is configured to determine the instrument audio source of the instrument based on the instrument spectrogram thereof; and finally, the instrument audio sources of the at least one instrument are respectively fed to the at least one speaker and are correspondingly reproduced by the at least one speaker.

BRIEF DESCRIPTION OF THE DRAWINGS

These and/or other features, aspects and advantages of the present invention will be better understood after reading the following detailed description with reference to the accompanying drawings, throughout which the same characters represent the same members, where.

DETAILED DESCRIPTION

The detailed description of the embodiment of the invention is as follows. However, it should be understood that the disclosed embodiments are merely exemplary, and may be embodied in various alternative forms. The drawings are not necessarily depicted on scale; and some features may be expanded or minimized to show details of specific components. Therefore, the specific structural and functional details disclosed herein should not be interpreted as restrictive, but only as a representative basis for teaching those skilled in the art to variously employ the present disclosure.

Wireless connection allows multiple speakers to be connected to each other. For example, music audio streams can be played simultaneously through these speakers to obtain a stereo effect. However, the mechanism of playing mixture music audio streams simultaneously through the multiple speakers may not meet the multi-channel and low-latency audio transmission requirements; and it only increases the sound pressure level, but makes no contribution to the enhancement of the sense of depth of the sound field.

With the increasing demand for listening to music played via multiple instruments, users may wish to achieve better sound quality, higher bandwidth efficiency, and higher data throughput, as achieved by, for example, multi-channel sound systems, even with portable devices, while adopting a low-latency and reliable synchronous connection of multiple speakers to restore the original sound field effect during music recording, which can be achieved by, for example, treating the multiple speakers as a multi-channel system accordingly, and then reproducing the audio sources of various instruments restored in different channels via different speakers.

Therefore, the present disclosure provides the method to reproduce the original sound field effect during music recording by first processing selected music through the instrument separation model to obtain the separate audio source of each instrument after separation, and then feeding the broadcast audio through multiple channels to different speakers for playing.

Figure 1:
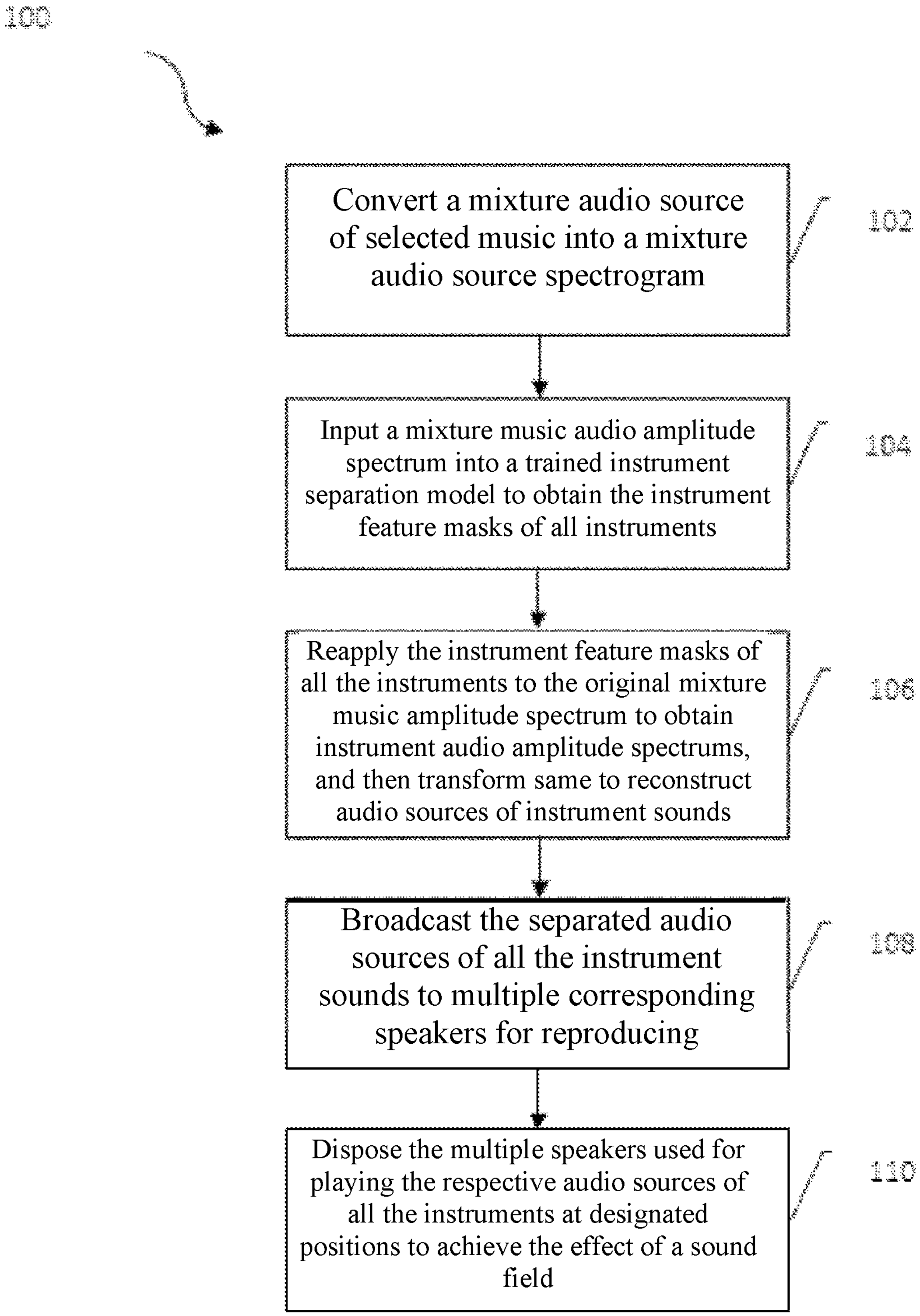
FIG. 1 shows an exemplary flow chart of a method for separating instruments from a mixture music audio source and reproducing same separately on multiple speakers according to one or more embodiments of the present disclosure.

FIG. 1 shows an exemplary flow chart 100 of a method for separating instruments and reproducing music on multiple speakers in accordance with the present disclosure. Due to the different characteristics of the vibration of different objects, the basic three elements of sound (i.e., tone, volume and timbre) are related to the frequency, amplitude, and spectral structure of sound waves, respectively. A piece of music can express the magnitude of amplitude at a certain frequency at a certain point in time through a music audio spectrogram, and waveform data of sound propagating in a medium is represented by a two-dimensional image, which is a spectrogram. Differences in the distribution of energy between different instruments can be reflected in the radiating capacity of the sound produced by that instrument at different frequencies. The spectrogram is a two-dimensional graph represented by the time dimension and the frequency dimension, and the spectrogram can be divided into multiple pixels by, for example, taking the time unit as the abscissa and the frequency unit as the ordinate; and the different shades of colors of all the pixels can reflect the different amplitudes at corresponding time-frequencies. For example, bright colors denote higher amplitudes, and dark colors denote lower amplitudes.

Therefore, referring to the flow chart of the method for separating and reproducing the instruments shown in FIG. 1, firstly, in S102, a selected mixture music audio source is converted into a mixture music spectrogram. A mixture spectrogram image of a selected piece of music is formed by using the following method:

$$x(t)=\text{overlap}(\text{input},50\%) \quad (1)$$

$$x_n(t)=\text{windowing}(x(t)) \quad (2)$$

$$X_n(f)=\text{FFT}(X_n(t)) \quad (3)$$

$$X_{nb}(f)=[|X_1(f)|,|X_2(f)|, \ldots ,|X_n(f)|] \quad (4)$$

including:

x (t): inputting a time domain of a mixture audio signal of the selected music;

X(ƒ): performing fast Fourier transform to achieve frequency domain representation of the mixture audio signal;

$X_n$(ƒ): inputting a spectrogram of the signal from a time frame n;

overlap(*) and windowing(*) are overlapping and windowing processing respectively, where an overlap coefficient is based on an experimental value, for example, adopting 50% of the experimental value; FFT corresponds the fast Fourier transform; and |*| is an absolute value operator, which is equivalent to taking an amplitude value of sound waves. Therefore, the buffer $X_{nb}$ (ƒ) of $X_n$(ƒ) represents a spectrogram of the mixture audio of the music x(t) to be input into an instrument separation model.

Next, in S104, an amplitude image of the spectrogram of the mixture audio is input into the instrument separation model to extract audio features of all the instruments separately.

The present disclosure provides the instrument separation model that enables the separation of different musical elements from selected original mixture music audio by machine learning. For example, spectrogram amplitude feature masks of different instrument audios are separated out from a mixture music audio by machine learning combined with instrument identification and masking. Although the present disclosure refers to the separation of music played by multiple instruments, it does not preclude the inclusion of the vocal portion of the mixture audio as equivalent to one instrument.

Figure 2:
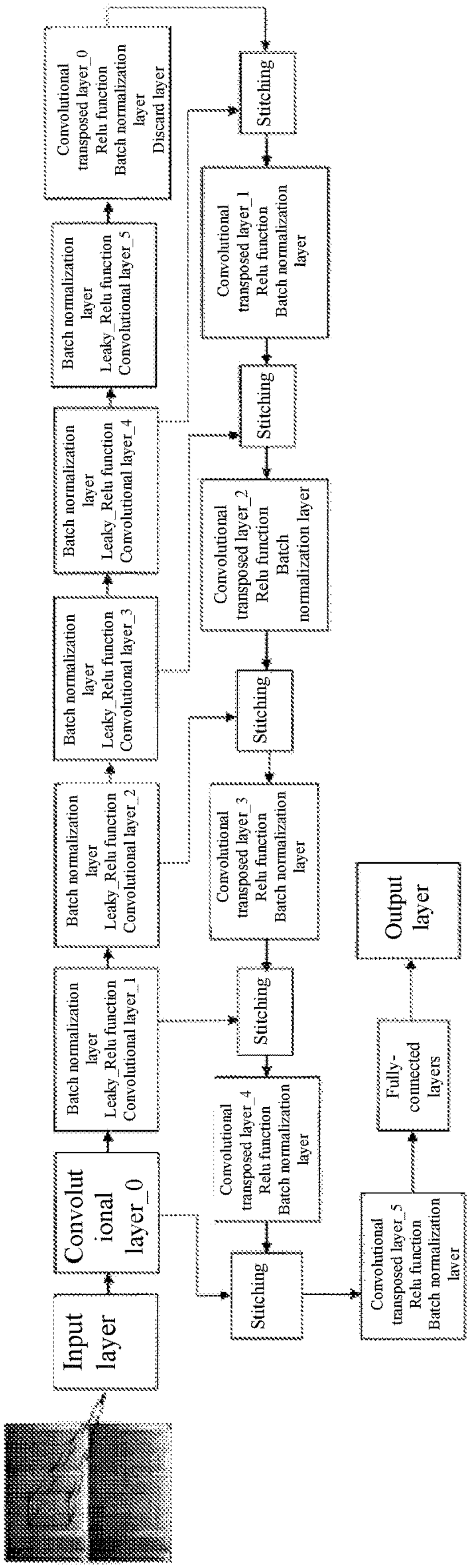
FIG. 2 shows a schematic diagram of a structure of an instrument separation model according to one or more embodiments of the present disclosure.

The instrument separation model provided by the present disclosure for separating instruments from a music audio source is shown in FIG. 2. The instrument separation model can be used for, for example, building an instrument sound source separation model generated based on a convolutional neural network. There are various network models of the convolutional neural network. In processing of images, the convolutional neural network can extract better features in the images due to its special organizational structure. Therefore, by processing the music audio spectrogram based on the instrument sound source separation model of the convolutional neural network provided by the present disclosure, the features of all kinds of instruments can be extracted, so that one and multiple instruments are separated out from the music audio played by mixed instruments, and subsequent separate reproduction is further facilitated.

The instrument sound source separation model of the present disclosure shown in FIG. 2 is divided into two parts, namely, a convolutional layer part and a deconvolutional layer part, where the convolutional layer part includes at least one two-dimensional (2D) convolutional layer, and the deconvolutional layer part includes at least one two-dimensional (2D) deconvolutional layer. The convolutional layers and the deconvolutional layers are used to extract features of images, and pooling layers (not shown) can also be disposed among the convolutional layers for sampling the features so as to reduce training parameters, and can reduce the overfitting degree of the network model at the same time. In the exemplary embodiment of the instrument sound source separation model of the present disclosure, there are six 2D convolutional layers (denoted as convolutional layer_0 to convolutional layer_5) available at the convolutional layer part, and there are correspondingly six 2D convolutional transposed layers (denoted as convolutional transposed layer_0 to convolutional transposed layer_5) available at the deconvolutional layer part. The first 2D convolutional transposed layer at the deconvolutional layer part is cascaded behind the last 2D convolutional layer at the convolutional layer part.

At the deconvolutional layer part, the result of each 2D convolutional transposition is further processed by a concatenate function and stitched with the feature result extracted from the corresponding previous 2D convolution at the convolutional layer part before entering the next 2D convolutional transposition. As shown, the result of the first 2D convolutional transposition_0 at the deconvolutional layer part is stitched with the result of the fifth 2D convolution_4 at the convolutional layer part, the result of the second 2D convolutional transposition_1 at the deconvolutional layer part is stitched with the result of the fourth 2D convolution_3 at the convolutional layer part, the result of the third 2D convolutional transposition_2 is stitched with the result of the third 2D convolution_2, the result of the fourth 2D convolutional transposition_3 is stitched with the result of the second 2D convolution_1, and the result of the fifth 2D convolutional transposition_4 is stitched with the result of the first 2D convolution_0.

Batch normalization layers are added between every two adjacent 2D convolutional layers at the convolutional layer part and every two adjacent 2D convolutional transposed layers at the deconvolutional layer part to renormalize the result of each layer, so as to provide acceptable data for passing the next layer of neural network. In addition, a leaky rectified linear unit (Leaky_Relu) is further added between every two adjacent 2D convolutional layers, including Leaky_Relu function processing, and the function is expressed as $f(x)=\max(kx, 0)$. A rectified linear unit of Relu function processing is further added between every two adjacent 2D convolutional transposed layers, and the function is expressed as $f(x)=\max(0, x)$. Both of the two rectified linear units act to prevent gradient disappearance in the instrument separation model. In the exemplary embodiment of FIG. 2, three discard layers are also added for Dropout function processing, thus preventing overfitting of the instrument separation model. Then, after the last 2D convolutional transposition_5, the 1-2 layers are fully-connected layers, the fully-connected layers are responsible for connecting the extracted audio features and thus enabling the same to be output from an output layer at the end of the model. In the exemplary embodiment of instrument separation model constructed in FIG. 1, the mixture music audio spectrogram amplitude graph is input into an input layer, and the spectrogram graph features of all instruments are extracted by the processing of the deep convolutional neural network in the model; and a softmax function classifier can be disposed at the output end as the output layer, and its function is to normalize the real number output into multiple types of probabilities, so that the audio spectrogram masks of the instruments can be extracted from the output layer of the instrument separation model.

For a newly established machine learning model, it is first necessary to use some databases as training data sets to train the model so as to adjust the parameters in the model. After the instrument separation model shown in FIG. 2 is built, an audio played by multiple instruments and having already contained respective sound track records of all the instruments can be selected, for example, from a database as the training data set to train the instrument separation model. In this case, some training data can be found from publicly available public music databases, such as the publicly available music database 'Musdb18' which contains more than 150 full-length pieces of music in different genres (lasting for about 10 hours), the separately recorded vocals, pianos, drums, bass, and the like that are corresponding to these pieces of music, as well as the audio sources of other sounds contained in the music. In addition, music such as vocals, pianos, and guitars with multi-sound track separately recorded in some other specialized databases can also be used as the training data sets.

When training the model, a set of training data sets are selected and sent to the neural network, and the model parameters are adjusted according to the difference between an actual output of the network and an expected output. That is to say, in this exemplary embodiment, music can be selected from a known music database, the mixture audio of this music can be converted into a mixture audio spectrogram image and then put into the input, all instrument audios of the music are respectively converted into characteristic spectrogram images of the instruments, and the obtained images are placed in the output of the instrument separation model as the expected output. By adopting the machine learning to try and try again, the instrument separation model can be trained, and the model features can be modified. For the instrument separation model based on a 2D convolutional neural network, the model features of the machine learning during the model training process can mainly include the weight and bias of a convolution kernel, the parameters of a batch normalization matrix, etc.

The training time of the model is usually based on offline processing, so it can be aimed at the model that provides the best performance regardless of computational resources. All the instruments included in the selected music in the training data set can be trained one by one to obtain the feature of each of the instruments, or the expected output of the multiple instruments can be placed in the output of the model to obtain the respective features thereof at the same time, so the trained instrument separation model has fixed model features and parameters. For example, the spectrogram of a mixture music audio of music selected from the music database 'Musdb 18' can be input into the input layer of the instrument separation model, and the spectrograms of vocal tracks, piano tracks, drum tracks and bass tracks of the music included in the database can be placed in the output layer of the instrument separation model, so that the vocal feature model parameters, piano feature model parameters, drum feature model parameters and bass feature model parameters of the model can be trained at the same time.

By using the trained instrument separation model to process a new music audio spectrogram amplitude input, an instrument feature mask of each of all the instruments can be obtained accordingly, that is, the probability that the spectrogram thereof accounts for the amplitude of the original mixture music audio spectrogram. The trained model should be expected to achieve more real-time processing capacity and better performance.

After being trained, the instrument separation model established in FIG. 2 can be loaded into a smart device (such as a smartphone, or other mobile devices, and audio play equipment) of a user to achieve the separation of music sources.

Returning to the flow chart shown in FIG. 1, in S104, the feature mask of a certain instrument can be extracted by inputting the mixture audio spectrogram of the selected music into the instrument separation model; and the feature mask of the certain instrument can mark the probability thereof in all pixels of the spectrogram, which is equivalent to a ratio of the amplitude of the certain instrument's voice to that of the original mixture music, so the feature mask of the certain instrument can be a real number ranging from 0 to 1, and the audio of the certain instrument can be distinguished from the mixture audio source accordingly. Then, in S106, the feature mask of the certain instrument is reapplied to the spectrogram of the original mixture music audio, so as to obtain the pixels thereof that are more prominent than the others and further stitch same into a feature spectrogram of the certain instrument; and the spectrogram of the certain instrument is subjected to inverse fast Fourier transform (iFFT), so that an individual sound signal of the certain instrument can be separated out, and an individual audio source thereof is thus obtained.

The above process can be described as: inputting an amplitude image $X_{nb}$ $(f)$ of the mixture audio spectrogram of the selected piece of music x (t) into the instrument separation model for processing to obtain the feature masks $X_{nbp}(f)$ of the instruments, the type of instruments depending on instrument feature model parameters currently set in the instrument separation model of this input. For example, if trained piano feature model parameters are currently set in the instrument separation model, the output obtained by processing the input mixture audio spectrogram is a piano feature mask; and then, the piano feature model parameters are replaced with, for example, bass feature model parameters, and the mixture audio spectrogram is input again, so that the obtained output is a bass feature mask. Thus, different instrument feature masks can be replaced in turn; and each time the mixture audio spectrogram of the music is input, the respective feature masks of all the instruments can be obtained successively. The sounds in the music audio that cannot be separated out by the instrument separation model can be included in an extra sound feature output channel.

In addition, the original mixture audio source processed with the instrument separation model can be a mono audio source, a dual-channel audio source, or even a multi-channel stereo mixture audio source. In the exemplary embodiment shown in FIG. 2, the two spectrograms input into the input layer of the instrument separation model respectively represent spectrogram images of the left channel audio and right channel audio of a dual-channel mixture music stereo audio. For the processing of the instrument separation model, on the one hand, the audios of left and right channels can be processed separately, so that an instrument feature mask of the left channel and an instrument feature mask of the right channel are obtained respectively. On the other hand, alternatively, the instrument feature masks can be extracted after the audios of the left and right channels are mixed together.

Next, referring to the flow chart in FIG. 1, in S106, the obtained instrument feature mask $X_{nbp}$ $(f)$ is reapplied to the mixture audio spectrogram of the music of the original input model, for example, firstly, smoothing is carried out to prevent distortion, the instrument feature masks predicted by the instrument separation model are multiplied with the mixture audio spectrogram of the original input music, and the spectrogram of the sound of the each of the instruments is then obtained by outputting. The smoothing can be expressed as:

$$Y_{nb}=X_{nb}*(1-a(f))+X_{nbp}(f)*a(f) \tag{5}$$

where smoothing coefficient a $(f)$=sigmoid (instrument feature mask)*(perceptual frequency weighting).

The sigmoid function is defined as $$S(x) = \frac{1}{1+e^{-x}},$$

where one of the parameters, the instrument feature mask, is the output of the instrument separation model, and the other parameter, the perceptual frequency weighting, is determined based on experimental values. Finally, the spectrograms of the instruments are transformed back to the time domain by using the iFFT and an overlap-add method, so that the reconstructed audio sources of the instrument sounds are obtained, as shown below:

$$Y_{nbc}(f)=Y_{nb}(f)*e^{i*phase}(X_{nb}(f)) \tag{6}$$

$$y_b(t)=\text{iFFT}(Y_{nbc}(f)) \tag{7}$$

$$y_n(t)=\text{windowing}(y_b(t)) \tag{8}$$

$$y(t)=\text{overlap\_add}(y_n(t),50\%) \tag{9}$$

where iFFT represents an inverse fast Fourier transform, and overlap_add(*) represents an overlap-add function.

Figure 3:
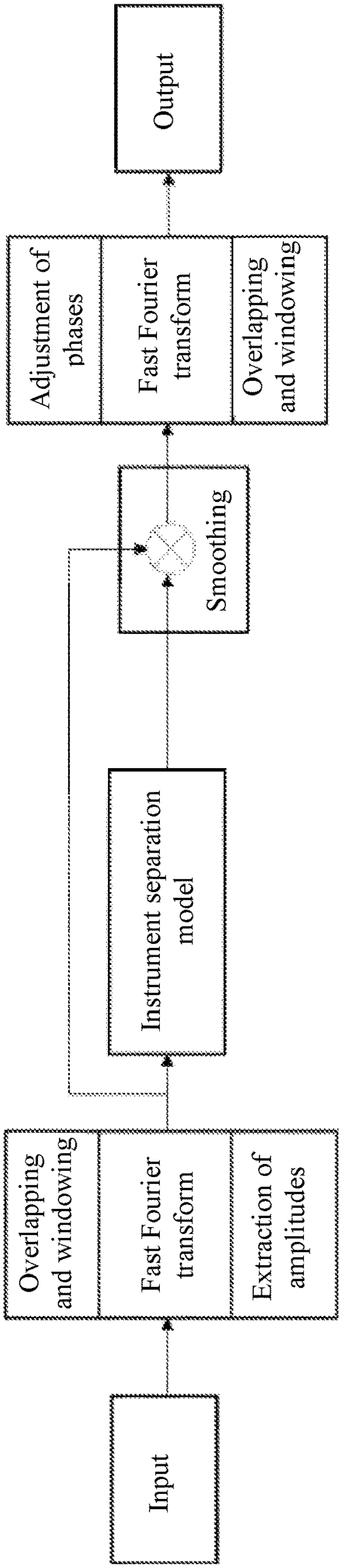
FIG. 3 shows a schematic diagram of a structure of an upgraded instrument separation model according to one or more embodiments of the present disclosure.

Alternatively, the extraction of the spectrogram images from mixture music time domain signals x(t), and the reapplication of the instrument feature masks which are processed and output by the instrument separation model to the original input mixture music spectrogram for obtaining the spectrogram of the individual sound of the each instrument, the implementation of reconstruction for obtaining the audio sources y(t) of the sounds of the instruments, and the like, that are involved in the above instrument separation process, can also be regarded as newly added neural network layers in addition to the instrument separation model, so that the instrument separation model provided above can be upgraded. The upgraded instrument separation model can be described as including a 2D convolutional neural network-based instrument separation model and the above-mentioned newly added layers, as shown in FIG. 3. Therefore, the music signal processing features included in this upgraded instrument separation model, such as window shapes, frequency resolutions, time buffering and overlap percentages, can be modified by machine learning. After the upgraded instrument separation model is transformed into a real-time executable model, as long as the selected music is directly input into the upgraded instrument separation model, multiple maximized separate instrument audio sources, which are separately reconstituted from the mixture music audio source, of all the instruments can be output.

After being obtained, the multiple separate instrument audio sources are respectively fed to multiple speakers via signals through different channels, each channel including the sound of a type of instrument, and then all the instrument audio sources are played synchronously, which can reproduce or recreate an immersive sound field listening experience for users.

For example, after a piece of music to be played on a smart device of a user is input into the instrument separation model, and the separate audio sources of all the instruments are reconstructed, multiple speakers can be connected to the smart device of the user by a wireless technology, and the audio sources of all the instruments are played at the same time through different channels, so that the user who plays the music with the multiple speakers at the same time may get a listening experience with a better depth effect.

In an exemplary embodiment, for a portable Bluetooth speaker that is often used in conjunction with a smart device of a user, it is different from a mono stereo audio stream transmission mode of connecting a master speaker to the smart device of the user by, for example, classical Bluetooth, and then broadcasting to multiple other slave speakers by using the master speaker in a way of mono signals, the present disclosure adopts, for example, a Bluetooth low energy (BLE) audio technology, which enables multiple speakers (groups) to be regarded as a multi-channel system, so that the smart device of the user can be connected to the multiple speakers synchronously with low latency and reliable synchronization; and after being separated, the sounds of all instruments are transmitted to the speaker group that enables a broadcast audio function via multiple channel signals, then the different speakers receive the broadcast audio signals broadcasted by the smart device through multiple channels, audio sources of the different channels are modulated and demodulated, and all the instruments are synchronously reproduced, so that the sound field with an immersive listening effect is reproduced or restored.

Figure 4:
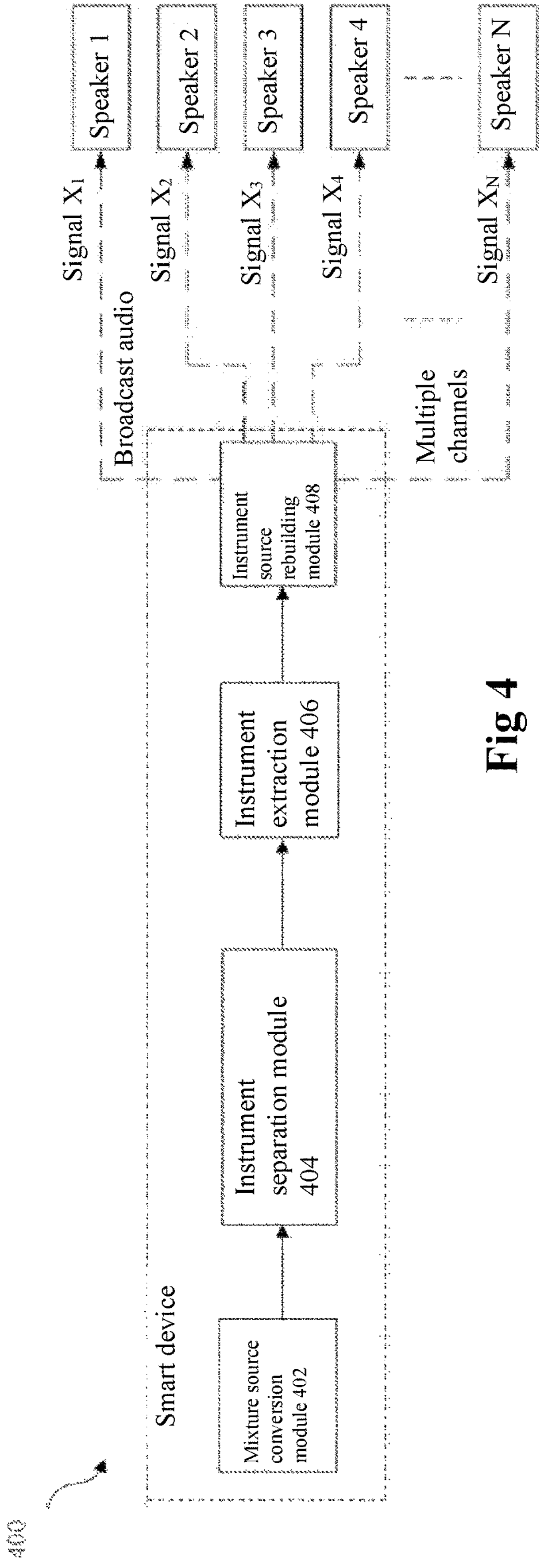
FIG. 4 shows a block diagram of a system for instrument separating and reproducing for a mixture audio source according to one or more embodiments of the present disclosure.

FIG. 4 shows a block diagram of a system 400 for instrument separating and reproducing for a mixture audio source according to one or more embodiments of the present disclosure. In an exemplary embodiment of the present disclosure, the system for instrument separating and reproducing for a mixture audio source is positioned on a smart device of a user, and includes a mixture source conversion module 402, an instrument separation module 404, an instrument extraction module 406 and an instrument source rebuild module 408. When the system 400 is in use, firstly, a mixture music audio source is obtained from, for example, a memory (not shown) of the smart device, and is then converted into a mixture audio source spectrogram after being subjected to overlapping and windowing, fast Fourier transform, etc. in the mixture source conversion module 402. The mixture audio source spectrogram is then sent to the instrument separation module 404 including an instrument separation model, and the instrument feature masks of all instruments in the mixture audio source are sequentially obtained after feature extraction is performed on the mixture audio source spectrogram via the instrument separation model, and the feature masks of all the instruments are output into the instrument extraction module 406. The instrument feature masks are reapplied to the mixture audio source spectrogram in the instrument extraction module 406, which may include, for example, smoothing and then multiplying the instrument feature masks with the original mixture audio source spectrogram, so that the respective spectrograms of all the instrument sources are obtained. Finally, in the instrument source rebuild module 408, the respective spectrograms of all the instruments are processed by, for example, iFFT, overlapping, windowing, and the like so as to be converted into audio sources thereof, respectively. In the exemplary embodiment shown in FIG. 4, the instrument audio sources of all the instruments determined by the instrument source rebuild module 408 on the smart device may support the modulation of multiple audio streams corresponding to the multiple instruments onto multiple channels by a BLE connection, and are broadcast to multiple speakers (groups) by using a broadcast audio function in a form of multi-channel signals. It is understandable that, instrument sources or sounds that cannot be separated by the instrument separation module can also be modulated to one or more channels and sent to the corresponding speakers (groups) for playing. As shown in FIG. 4, the multiple speakers (such as the speaker 1, the speaker 2, the speaker 3, the speaker 4, . . . and the speaker N) that enable the broadcast audio function respectively receive broadcast audio signals (the signal $X_1$, the signal $X_2$, the signal $X_3$, the signal $X_4$, . . . , and the signal $X_N$), and audio streams of the all the instruments are demodulated accordingly.

Due to the low power consumption and large transmission frequency of the BLE technology, the BLE technology can support wider bandwidth transmission to achieve faster synchronization; and a digital modulation technology or direct sequence spread spectrum is adopted, so that multi-channel audio broadcasting can be realized. In addition, the BLE technology can support transmission distances greater than 100 meters, so that the speakers can receive and synchronously reproduce audio sources within a larger range around the smart device of the user. Referring to S108 in the flow chart shown in FIG. 1 of the method, as the exemplary embodiment of the present disclosure, hundreds of speakers can be connected to the smart device of the user by BLE wireless connection, and the smart device broadcasts the respective reconstructed audio sources of all the instruments through multiple channels to all the speakers having the broadcast audio function. For example, separate audio sources of all instruments for playing mixed recorded symphony music can be separated out therefrom, and a sufficient number of speakers are used to reproduce the received and demodulated audio sources of all the instruments, which may amplify the user's listening experience to an epic level and further cause the user to achieve a perfect sound field shock effect.

Figure 5:
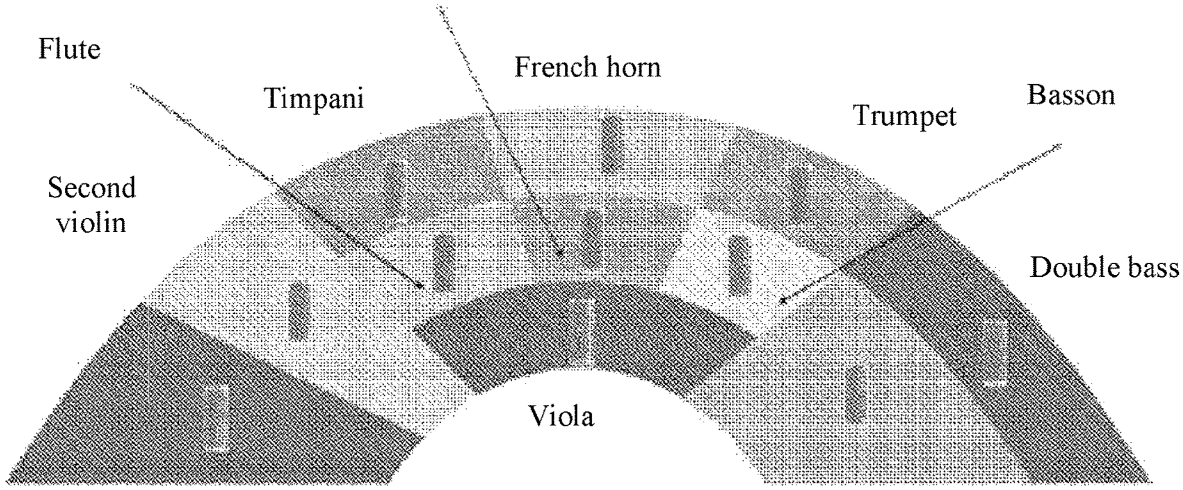
FIG. 5 shows a schematic diagram of disposing multiple speakers at designated positions according to one or more embodiments of the present disclosure.

In some cases, as shown in step S110 of FIG. 1, in order to reproduce or reconstruct the live performance of a band or achieve a magnificent sound field effect, the speakers playing different instrument audio sources may be placed at designated positions relative to listeners. FIG. 5 shows an exemplary embodiment of arranging speakers at the positions according to, for example, a layout required by a symphony orchestra for reproducing a symphony. The exemplary embodiment shows the reproduction of the different instruments for playing the symphonic work and even different parts thereof by using the multiple speakers, where the different instruments and all the parts of the reproduced music have first been separated out on the smart device of the user via an instrument separation model and modulated into multi-channel sound signals, and are then transmitted to the multiple speakers (groups) by audio broadcasting; and each or each group of speakers receive the audio broadcasting signals and demodulate same to obtain the audio source signals of all the instruments, thus being capable of respectively reproducing all the instruments and parts. For example, with a fixed separation order of all instruments known in the instrument separation model, a separate audio sources of each instrument can be transmitted correspondingly to the speaker at the designated position.

In this case, as mentioned previously in the present disclosure, when the original mixture music is divided into, for example, left channel audio sources and right channel audio sources and then input to the instrument separation model, the audio sources, which are reconstructed after the separation of the instrument separation model, of all the instruments are respectively modulated to different channels of the broadcast audio signals, each channel at this point may being, for example, but not limited to mono or binaural. The speakers receive the signals and demodulate same to obtain the audio source signals of the instruments. For example, the left channel audio sources and the right channel audio sources may be distinguished in the same speaker, or for example, the audio sources from a plurality of channels of the same instrument may be assigned to a plurality of speakers for playing.

In addition, as shown in FIG. 5, in one case, a first violin and a second violin are included in, for example, the symphony orchestra, they may be separated out as the same type of instruments from the mixture music audio source input into the instrument separation model, but audio sources of the same type of instruments can be broadcast, for example, with two or more speakers. Alternatively, in the other case of sounds played by string parts such as a viola and a cello, as well as chords played by the same type of instruments or different parts played by a plurality of the same type of instruments, these instruments or parts can also be assigned to multiple speakers, because the instrument separation model can distinguish different frequency components; although the separation of sounds made by the same type of instruments may not be as effective as that of sounds made by completely different types of instruments, but still does not affect the performance of the feeding to the one or more speakers for playing.

In accordance with the above description, those skilled in the art can understand that the above embodiments can be implemented in a way of being applied to a hardware platform that executes software. Accordingly, any combination of one or more computer-readable media can be used to perform the method provided by the present disclosure. The computer-readable medium may be a computer-readable signal medium or a computer-readable storage medium. The computer-readable storage medium may be, for example, but not limited to, an electronic, magnetic, optical, electromagnetic, infrared, or semiconductor system, apparatus, or equipment, or any suitable combination of the foregoing. More specific exemplary embodiments (non-exhaustive list) of the computer-readable storage media may, for example, include: electrical connections with one or more wires, portable computer floppy disks, hard disks, random access memory (RAM), read-read-only memory (ROM), erasable programmable read-only memory (EPROM or flash memory), optical fibers, portable compact disc read-only memory (CD-ROM), optical storage devices, magnetic storage devices, or any suitable combination of the foregoing. In accordance with the context of the present disclosure, the computer-readable storage medium may be any tangible medium that may include or store programs used by or in combination with an instruction execution system, apparatus, or equipment.

The elements or steps referenced in a singular form and modified with the word 'a/an' or 'one' as used in the present disclosure shall be understood not to exclude being plural, unless such an exception is specifically stated. Further, the reference to the 'embodiments' or 'exemplary embodiments' of the present disclosure is not intended to be construed as exclusive, but also includes the existence of other embodiments of the enumerated features. The terms 'first', 'second', 'third', and the like are used only as identification, and are not intended to emphasize the number requirement or positioning order for their objects.

Automatic surround pairing and calibrating for ambiophonic systems mentioned herein includes the following:

Item 1: a method provided by the present disclosure in one or more embodiments for instrument separating and reproducing for a mixture audio source, including but not limited to the following steps:

obtaining a mixture audio source spectrogram based on the mixture audio source, where the mixture audio source includes sound of at least one instrument;

using an instrument separation model to sequentially obtain an instrument feature mask of each of the at least one instrument from the mixture audio source;

obtaining an instrument spectrogram of the each of the at least one instrument based on the instrument feature mask of the each of the at least one instrument;

determining an instrument audio source of the each of the at least one instrument based on the instrument spectrogram; and respectively feeding the respective instrument audio sources of the at least one instrument to at least one speaker, and reproducing the respective instrument audio sources of the at least one instrument accordingly by the at least one speaker.

Item 2: the method of item 1, where the instrument separation model is based on a 2D convolutional neural network including multiple 2D convolutional layers and multiple 2D convolutional transposed layers for extracting the instrument feature masks of the at least one instrument.

Item 3: the method of item 1 and item 2, where the instrument separation model is pre-trained with a known training data set including mixture audios and their corresponding instrument separation audios of at least one of instrument included.

Item 4: the method of item 1 to item 3, where the mixture audio source may be a stereo audio source including at least one channel, and the instrument separation model may process each of the at least one channel of the stereo audio source, separately.

Item 5: the method of item 1 to item 4, where obtaining the instrument spectrogram of the each of the at least one instrument includes multiplying the obtained instrument feature masks of the at least one instrument with the mixture audio source spectrogram, separately.

Item 6: the method of item 1 to item 5, where respectively feeding the respective instrument audio sources of the at least one instrument to at least one speaker includes modulating the respective instrument audio sources of the at least one instrument into at least one corresponding broadcast audio signal and broadcasting same to the at least one speaker in form of multi channels, and correspondingly demodulating the corresponding instrument audio sources of the at least one instrument by the at least one speaker.

Item 7: the method of item 1 to item 6, where the at least one broadcast audio signal each includes the instrument audio source of the corresponding one of the at least one instrument.

Item 8: the method of item 1 to item 7, where the at least one broadcast audio signal each may be a mono audio signal or a stereo audio signal.

Item 9: the method of item 1 to item 8, further including respectively disposing the at least one speaker to designated positions, and reproducing the instrument audio sources, demodulated by the at least one speaker, of the corresponding ones of the at least one instrument, respectively.

Item 10: the method of item 1 to item 9, where respectively disposing the at least one speaker to designated positions includes arranging the positions of the at least one speaker according to a symphony orchestra layout.

Item 11: a non-transitory computer-readable medium containing instructions provided by the present disclosure in one or more embodiments, where the instructions, when executed by a processor, perform the following steps including:

obtaining the mixture audio source spectrogram based on the mixture audio source, where the mixture audio source includes sound of at least one instrument;

using an instrument separation model to sequentially obtain an instrument feature mask of each of the at least one instrument from the mixture audio source;

obtaining an instrument spectrogram of the each of the at least one instrument based on the instrument feature mask of the each of the at least one instrument;

determining an instrument audio source of the each of the at least one instrument based on the instrument spectrogram; and respectively feeding the instrument audio sources of the at least one instrument to at least one speaker for reproducing.

Item 12: the non-transitory computer-readable medium of item 11, where the instrument separation model is based on a 2D convolutional neural network including multiple 2D convolutional layers and multiple 2D convolutional transposed layers for extracting the instrument feature masks of the at least one instrument.

Item 13: the non-transitory computer-readable medium of item 11 and item 12, where the instrument separation model is pre-trained with a known training data set including mixture audios and their corresponding instrument separation audios of at least one of instrument included.

Item 14: the non-transitory computer-readable medium of item 11 to item 13, where the mixture audio source may be a stereo audio source including at least one channel, and the instrument separation model may process each of the at least one channel of the stereo audio source, separately.

Item 15: the non-transitory computer-readable medium of item 11 to item 14, where obtaining the instrument spectrogram of the each of the at least one instrument includes multiplying the obtained instrument feature masks of the at least one instrument with the mixture audio source spectrogram, separately.

Item 16: the non-transitory computer-readable medium of item 11 to item 15, where respectively feeding the respective instrument audio sources of the at least one instrument to at least one speaker includes modulating the respective instrument audio sources of the at least one instrument into at least one corresponding broadcast audio signal and broadcasting same to the at least one speaker in form of multi channels.

Item 17: the non-transitory computer-readable medium of item 11 to item 16, where the each of the at least one broadcast audio signal includes the instrument audio source of the corresponding one of the at least one instrument.

Item 18: the non-transitory computer-readable medium of item 11 to item 17, where the at least one broadcast audio signal each may be a mono audio signal or a stereo audio signal.

Item 19: a system provided by the present disclosure in one or more embodiments for instrument separating and reproducing for a mixture audio source, including:

a spectrogram conversion module configured to obtain a mixture audio source spectrogram based on the mixture audio source, where the mixture audio source includes sound of at least one instrument;

an instrument separation module including an instrument separation model, where the instrument separation model is configured to sequentially obtain an instrument feature mask of each of the at least one instrument from the mixture audio source;

an instrument extraction module configured to obtain an instrument spectrogram of the each of the at least one instrument based on the instrument feature mask of the each of the at least one instrument; and an instrument audio source rebuilding module configured to determine an instrument audio source of the each of the at least one instrument based on the instrument spectrogram, where the instrument audio sources of the at least one instrument are respectively fed to at least one speaker and are correspondingly reproduced by the at least one speaker.

Item 20: the system of item 19, where the instrument separation model is based on a 2D convolutional neural network including multiple 2D convolutional layers and multiple 2D convolutional transposed layers for extracting the instrument feature masks of the at least one instrument.

Item 21: the system of item 19 and item 20, where the instrument separation model is pre-trained with a known training data set including mixture audios and their corresponding instrument separation audios of at least one of instrument included.

Item 22: the system of item 19 to item 21, where the mixture audio source may be a stereo audio source including at least one channel, and the instrument separation model may process each of the at least one channel of the stereo audio source, separately.

Item 23: the system of item 19 to item 22, where obtaining the instrument spectrogram of the each of the at least one instrument includes multiplying the obtained instrument feature masks of the at least one instrument with the mixture audio source spectrogram, separately.

Item 24: the system of item 19 to item 23, where respectively feeding the respective instrument audio sources of the at least one instrument to at least one speaker includes modulating the respective instrument audio sources of the at least one instrument into at least one corresponding broadcast audio signal and broadcasting same to the at least one speaker in form of multi channels, and correspondingly demodulating the corresponding instrument audio sources of the at least one instrument by the at least one speaker.

Item 25: the system of item 19 to item 24, where the each of the at least one broadcast audio signal includes the instrument audio source of the corresponding one of the at least one instrument.

Item 26: the system of item 19 to item 25, where the at least one broadcast audio signal each may be a mono audio signal or a stereo audio signal.

Item 27: the system of item 19 to item 26, further including respectively disposing the at least one speaker to designated positions, and reproducing the instrument audio sources, demodulated by the at least one speaker, of the corresponding ones of the at least one instrument, respectively.

Item 28: the system of item 19 to item 27, where respectively disposing the at least one speaker to designated positions includes arranging the positions of the at least one speaker according to a symphony orchestra layout.

What is claimed is:

1. A method for instrument separating and reproducing for a mixture audio source, comprising:

obtaining a mixture audio source spectrogram based on the mixture audio source, wherein the mixture audio source comprises sound of at least one instrument;

using an instrument separation model to sequentially obtain an instrument feature mask of each of the at least one instrument from the mixture audio source;

obtaining an instrument spectrogram of each of the at least one instrument based on the instrument feature mask for each of the at least one instrument;

determining an instrument audio source of the each of the at least one instrument based on the instrument spectrogram; and respectively feeding the respective instrument audio source of the at least one instrument to at least one speaker, and reproducing the respective instrument audio source of the at least one instrument accordingly by the at least one speaker, wherein respectively feeding the respective instrument audio source of the at least one instrument to at least one speaker comprises modulating the respective instrument audio source of the at least one instrument into at least one corresponding broadcast audio signal and broadcasting the corresponding broadcast audio signal to the at least one speaker in a form of multi channels, and correspondingly demodulating the corresponding instrument audio source of the at least one instrument by the at least one speaker.

2. The method of claim 1, wherein the instrument separation model is based on a 2D convolutional neural network comprising multiple 2D convolutional layers and multiple 2D convolutional transposed layers for extracting the instrument feature mask of the at least one instrument.

3. The method of claim 1, wherein the instrument separation model is pre-trained with a known training data set comprising mixture audios and their corresponding instrument separation audios of at least one of instrument included.

4. The method of claim 1, wherein the mixture audio source may be a stereo audio source comprising at least one channel, and the instrument separation model may process each of the at least one channel of the stereo audio source, separately.

5. The method of claim 1, wherein obtaining the instrument spectrogram of the each of the at least one instrument comprises multiplying the obtained instrument feature mask of the at least one instrument with the mixture audio source spectrogram, separately.

6. The method of claim 1, wherein the at least one corresponding broadcast audio signal each comprises the instrument audio source of the corresponding one of the at least one instrument.

7. The method of claim 1, wherein the at least one corresponding broadcast audio signal is one of a mono audio signal or a stereo audio signal.

8. The method of claim 1, further comprising respectively disposing the at least one speaker to designated positions, and reproducing the instrument audio source, demodulated by the at least one speaker, of the corresponding ones of the at least one instrument, respectively.

9. The method of claim 8, wherein respectively disposing the at least one speaker to designated positions comprises arranging the designated positions of the at least one speaker according to a symphony orchestra layout.

10. A non-transitory computer-readable medium including instructions that, when executed by a processor, perform the following steps including:

obtaining a mixture audio source spectrogram based on a mixture audio source, wherein the mixture audio source comprises sound of at least one instrument;

using an instrument separation model to sequentially obtain an instrument feature mask of each of the at least one instrument from the mixture audio source;

obtaining an instrument spectrogram of each of the at least one instrument based on the instrument feature mask for each of the at least one instrument;

determining an instrument audio source of each of the at least one instrument based on the instrument spectrogram; and respectively feeding the instrument audio sources of the at least one instrument to at least one speaker for reproducing, wherein respectively feeding the respective instrument audio source of the at least one instrument to at least one speaker comprises modulating the respective instrument audio source of the at least one instrument into at least one corresponding broadcast audio signal and broadcasting the at least one corresponding broadcast audio signal to the at least one speaker in form of multi channels.

11. The non-transitory computer-readable medium of claim 10, wherein the instrument separation model is based on a 2D convolutional neural network comprising multiple 2D convolutional layers and multiple 2D convolutional transposed layers for extracting the instrument feature mask of the at least one instrument.

12. The non-transitory computer-readable medium of claim 10, wherein the instrument separation model is pre-trained with a known training data set comprising mixture audios and their corresponding instrument separation audios of at least one of instrument included.

13. The non-transitory computer-readable medium of claim 10, wherein the mixture audio source is a stereo audio source comprising at least one channel, and the instrument separation model processes each of the at least one channel of the stereo audio source, separately.

14. The non-transitory computer-readable medium of claim 10, wherein obtaining the instrument spectrogram of each of the at least one instrument comprises multiplying the obtained instrument feature mask of the at least one instrument with the mixture audio source spectrogram, separately.

15. The non-transitory computer-readable medium of claim 10, wherein the at least one corresponding broadcast audio signal each comprises the instrument audio source of the corresponding one of the at least one instrument.

16. The non-transitory computer-readable medium of claim 10, wherein the at least one corresponding broadcast audio signal is one of a mono audio signal or a stereo audio signal.

17. A system for instrument separating and reproducing for a mixture audio source, comprising:

a spectrogram conversion module configured to obtain a mixture audio source spectrogram based on the mixture audio source, wherein the mixture audio source comprises sound of at least one instrument;

an instrument separation module comprising an instrument separation model, wherein the instrument separation model is configured to sequentially obtain an instrument feature mask of each of the at least one instrument from the mixture audio source;

an instrument extraction module configured to obtain an instrument spectrogram of each of the at least one instrument based on the instrument feature mask for the each of the at least one instrument; and an instrument audio source rebuilding module configured to determine an instrument audio source for each of the at least one instrument based on the instrument spectrogram, wherein the instrument audio source for the at least one instrument is respectively transmitted to at least one speaker and is reproduced by the at least one speaker, wherein respectively feeding the respective instrument audio source of the at least one instrument to at least one speaker comprises modulating the respective instrument audio source of the at least one instrument into at least one corresponding broadcast audio signal and broadcasting the at least one corresponding audio signal to the at least one speaker in form of multi channels, and correspondingly demodulating the corresponding instrument audio source of the at least one instrument by the at least one speaker.

18. The system of claim 17, wherein the instrument separation model is based on a 2D convolutional neural network comprising multiple 2D convolutional layers and multiple 2D convolutional transposed layers for extracting the instrument feature mask of the at least one instrument.

19. The system of claim 17, wherein the instrument separation model is pre-trained with a known training data set comprising mixture audios and their corresponding instrument separation audios of at least one of instrument included.

20. The system of claim 17, wherein the mixture audio source is a stereo audio source comprising at least one channel, and the instrument separation model processes each of the at least one channel of the stereo audio source, separately.

21. The system of claim 17, wherein obtaining the instrument spectrogram of the each of the at least one instrument comprises multiplying the obtained instrument feature mask of the at least one instrument with the mixture audio source spectrogram, separately.

22. The system of claim 17, wherein the at least one corresponding broadcast audio signal each comprises the instrument audio source of the corresponding one of the at least one instrument.

23. The system of claim 17, wherein the at least one corresponding broadcast audio signal is one of a mono audio signal or a stereo audio signal.

24. The system of claim 17, further comprising respectively disposing the at least one speaker to designated positions, and reproducing the instrument audio source, demodulated by the at least one speaker, of the corresponding ones of the at least one instrument, respectively.

25. The system of claim 24, wherein respectively disposing the at least one speaker to designated positions comprises arranging the positions of the at least one speaker according to a symphony orchestra layout.

* * * * *